United States Patent [19]

Nakagami et al.

[11] Patent Number: 5,699,248
[45] Date of Patent: Dec. 16, 1997

[54] RUNNING SLIP CONTROL SYSTEM FOR A BULLDOZER

[75] Inventors: Hiroshi Nakagami; Shigenori Matsushita; Shigeru Yamamoto, all of Hirakata, Japan

[73] Assignee: Komatsu Ltd., Tokyo, Japan

[21] Appl. No.: 609,123

[22] Filed: Feb. 29, 1996

Related U.S. Application Data

[62] Division of Ser. No. 129,080, filed as PCT/JP92/00457, Apr. 10, 1992, Pat. No. 5,621,643.

[30] Foreign Application Priority Data

Apr. 12, 1991 [JP] Japan ............................ HEI 3-108451

[51] Int. Cl.$^6$ .............................. G06F 7/70; A01D 13/00
[52] U.S. Cl. ........................... 364/424.07; 364/426.01; 364/426.015; 364/426.027; 172/3; 172/7; 172/4.5; 172/2; 180/197
[58] Field of Search ................ 364/424.07, 424.01, 364/505, 426.03, 426.01, 426.018, 426.027, 426.015, 426.024; 172/3, 7, 4.5, 9, 239, 830, 832, 826, 2, 430, 12, 812, 821; 73/493; 89/1–13; 37/266, 348; 180/197, 167, 6.62; 414/699, 273, 4; 340/686

[56] References Cited

U.S. PATENT DOCUMENTS

| | | |
|---|---|---|
| 3,711,971 | 1/1973 | Martin .............................. 37/417 |
| 4,053,018 | 10/1977 | Takeda .............................. 172/4.5 |
| 4,157,118 | 6/1979 | Suganami et al. .............. 172/4.5 |
| 4,162,708 | 7/1979 | Johnson ........................... 172/4.5 |
| 4,166,506 | 9/1979 | Tezuka et al. .................. 172/4.5 |
| 4,194,574 | 3/1980 | Benson et al. ................. 172/430 |
| 4,282,933 | 8/1981 | Sugunami et al. ............ 172/4.5 |
| 4,423,785 | 1/1984 | Kurihara et al. ................. 172/3 |
| 4,630,685 | 12/1986 | Huck, Jr. et al. ........... 364/424.07 |
| 4,916,618 | 4/1990 | Stoltman .................... 364/426.031 |
| 5,046,565 | 9/1991 | Purcell ............................. 172/239 |
| 5,219,411 | 6/1993 | Yamamoto et al. .......... 364/424.07 |
| 5,287,280 | 2/1994 | Yamamoto et al. .......... 364/424.07 |
| 5,293,944 | 3/1994 | Matsumoto ................... 364/424.07 |
| 5,297,649 | 3/1994 | Yamamoto et al. .......... 364/424.07 |
| 5,333,479 | 8/1994 | Yamamoto et al. .......... 364/424.07 |
| 5,517,416 | 5/1996 | Torii et al. .................... 364/424.07 |
| 5,621,643 | 4/1997 | Nakagami et al. ............ 364/424.07 |

FOREIGN PATENT DOCUMENTS

| | | |
|---|---|---|
| 48-78702 | 10/1973 | Japan . |
| 64-62525 | 9/1989 | Japan . |
| 3-43523 | 2/1991 | Japan . |

*Primary Examiner*—Jacques Louis-Jacques
*Attorney, Agent, or Firm*—Armstrong, Westerman, Hattori, McLeland & Naughton

[57] ABSTRACT

A running slip control system for a bulldozer, comprising: (a) a running slip detector for detecting the running slip of a vehicle body; and (b) a blade controller for lifting a blade to eliminate the running slip when the running slip detector detects the occurrence of running slip.

11 Claims, 9 Drawing Sheets

(W: TOTAL WEIGHT OF BULLDOZER 1)

RUNNING SLIP CONTROL SYSTEM FOR A BULLDOZER

This is a divisional application of U.S. patent application Ser. No. 08/129,080, filed as PCT/JP92/00457 Apr. 10, 1992, now U.S. Pat. No. 5,621,643.

DISCLOSURE OF THE INVENTION (1) Field of the Invention

The present invention relates to a running slip control system for a bulldozer and, more particularly, to a technique for eliminating running slip that occurs when the amount of load imposed on the blade during dozing operation by the use of a bulldozer exceeds a specified amount.

(2) Description of the Prior Art

In conventional dozing operation by the use of such a bulldozer, the operator, who drives and operates the bulldozer, manually lifts or lowers the blade to dig and carry earth while eliminating running slip (i.e., shoe slip).

SUMMARY OF THE INVENTION

Manual operation for lifting and lowering the blade to dig and carry earth at high efficiency while eliminating running slip causes tremendous fatigue even to a skillful operator because he has to lift and lower the blade many times. Furthermore, such manual operation is so complicated that an unskilled operator would not only be exhausted but also would have great difficulty in carrying out the operation at all.

The invention has been made for the purpose of overcoming these problems and therefore one of the objects of the invention is to provide a running slip control system for a bulldozer, which enables digging and carrying at high efficiency while eliminating running slip without causing tremendous fatigue to the operator during dozing operation and which can be operated with a simple method.

The above object can be achieved by a running slip control system for a bulldozer according to the invention, the system comprising:

(a) a running slip detecting means for detecting running slip of a vehicle body; and (b) a blade controlling means for lifting a blade to eliminate the running slip when the running slip detecting means detects the occurrence of running slip.

According to the invention, if the running slip of the vehicle body is detected by the running slip detecting means, the blade controlling means performs lifting of the blade, thereby reducing the load on the blade caused by digging and carrying so that the running slip can be eliminated. This allows the blade to efficiently perform digging and carrying while the running slip being eliminated during dozing operation so that the operation can be carried out by a simple method without causing tremendous fatigue to the operator. The elimination of the running slip also leads to an improvement in the durability of crawler belts.

The detection of the running slip by the running slip detecting means is typically performed with one of the following methods.

1. There is employed a pitch angle sensor for detecting a pitch angle of the vehicle body when it inclines back and forth. The running slip of the vehicle body is detected by extracting acceleration components by frequency separation from the output of the pitch angle sensor which indicates the varying back-and-forth inclining condition of the vehicle body.

2. An acceleration sensor is employed, and the running slip of the vehicle body is detected from an output of the acceleration sensor which indicates the accelerating condition of the vehicle body.

3. A Doppler speed meter is employed and the running slip of the vehicle body is detected by comparing the actual speed of the vehicle body measured by the Doppler speed meter with a running speed of crawler belts for running the vehicle body.

The running slip detecting means, preferably, comprises:

(a) a moving average acceleration detecting means for detecting moving average acceleration from a set of acceleration values of the vehicle body, using moving average;

(b) a pitch angle detecting means for detecting a pitch angle of the vehicle body when the vehicle body inclines back and forth; and (c) an actual tractive force detecting means for detecting an actual tractive force of the vehicle body and for correcting the detected actual tractive force according to the pitch angle detected by the pitch angle detecting means. Such a running slip detecting means detects the running slip of the vehicle body when the moving average acceleration detected by the moving average acceleration detecting means is less than $-x°$ ($1° \approx 0.0174G$), or when the moving average acceleration is not less than $-x°$ and less than $-y°$ and the actual tractive force detected and corrected by the actual tractive force detecting means is not less than $zW$ (W=the total weight of the bulldozer). The moving average acceleration detecting means may include the afore-mentioned pitch angle sensor for detecting the pitch angle of the vehicle body when it inclines back and forth and the moving average acceleration is detected from the acceleration values of the vehicle body which are obtained from acceleration components extracted by frequency separation from the output of the pitch angle sensor, the output indicating the varying back-and-forth inclining condition of the vehicle body.

The detection of actual tractive force by the actual tractive force detecting means is typically performed with one of the following methods.

1. An engine revolution sensor for detecting a revolution speed Ne of an engine and a torque convertor output shaft revolution sensor for detecting a revolution speed Nt of an output shaft of a torque convertor are employed. Speed ratio e (=Nt/Ne), which is a ratio of the engine revolution speed Ne detected by the engine revolution sensor to the torque convertor output shaft revolution speed Nt detected by the torque convertor output shaft revolution sensor, is first obtained. Then, a torque convertor output torque is obtained from a torque convertor characteristic of the torque convertor, using the speed ratio e. The torque convertor output torque is then multiplied basically by a reduction ratio between the output shaft of the torque convertor and sprockets for driving crawler belts used for running the vehicle body. From this calculation, the actual tractive force of the vehicle body is obtained.

2. An engine revolution sensor, which detects a revolution speed of the engine when a lock-up mode is selected in the torque convertor equipped with a lock-up mechanism or when a direct transmission is employed, is used. Engine torque is obtained from an engine torque characteristic of the engine, using the revolution speed of the engine detected by the engine revolution sensor. Then, the engine torque is multiplied basically by a reduction ratio between the engine and sprockets for driving crawler belts used for running the vehicle body, and accordingly, the actual tractive force of the vehicle body is detected.

3. A driving torque sensor, which detects an amount of driving torque of sprockets for driving crawler belts used for running the vehicle body, is employed. The actual tractive force of the vehicle body is detected based on the amount of driving torque detected by the driving torque sensor.

4. A bending stress sensor, which detects an amount of bending stress generated at trunnions that are joints between the vehicle body and straight frames for supporting the blade, is employed. The actual tractive force of the vehicle body is detected based on the amount of bending stress detected by the bending stress sensor.

The blade controlling means is made to perform the automatic driving control to lift the blade so as to eliminate the running slip during dozing operation in the automatic driving mode on condition that a transmission is placed in the first forward speed or intermediate forward speed and that the blade is not in manual operation. This arrangement makes it possible to perform automatic driving only when a speed suitable for dozing operation such as the first forward speed or intermediate forward speed is selected in the automatic driving mode. Manual operation of the blade is carried out in preference to the automatic driving operation and therefore can be arbitrarily inserted at any time, interrupting the automatic driving operation.

BRIEF DESCRIPTION OF DRAWINGS

FIGS. 1 to 11 are for explaining a running slip control system for a bulldozer according to a preferred embodiment of the invention;

FIG. 1 is an external appearance of the bulldozer;

FIG. 2 is a skeleton diagram of a power transmission system;

FIG. 3 is a schematic block diagram of an overall construction;

FIGS. 5 to 11 are graphs showing a curved engine characteristic map; graph showing a pump correction characteristic map; graph showing a curved torque converter characteristic map; graph showing a pitch angle-load correction value characteristic map; graph showing a load control characteristic map; graph showing a ground leveling control characteristic map; and graph showing a load-ground leveling control weighted characteristic map, respectively.

DESCRIPTION OF THE PREFERRED EMBODIMENTS

With reference to the drawings, a running slip control system for a bulldozer according to a preferred embodiment of the invention will be hereinafter described.

Figure 1:
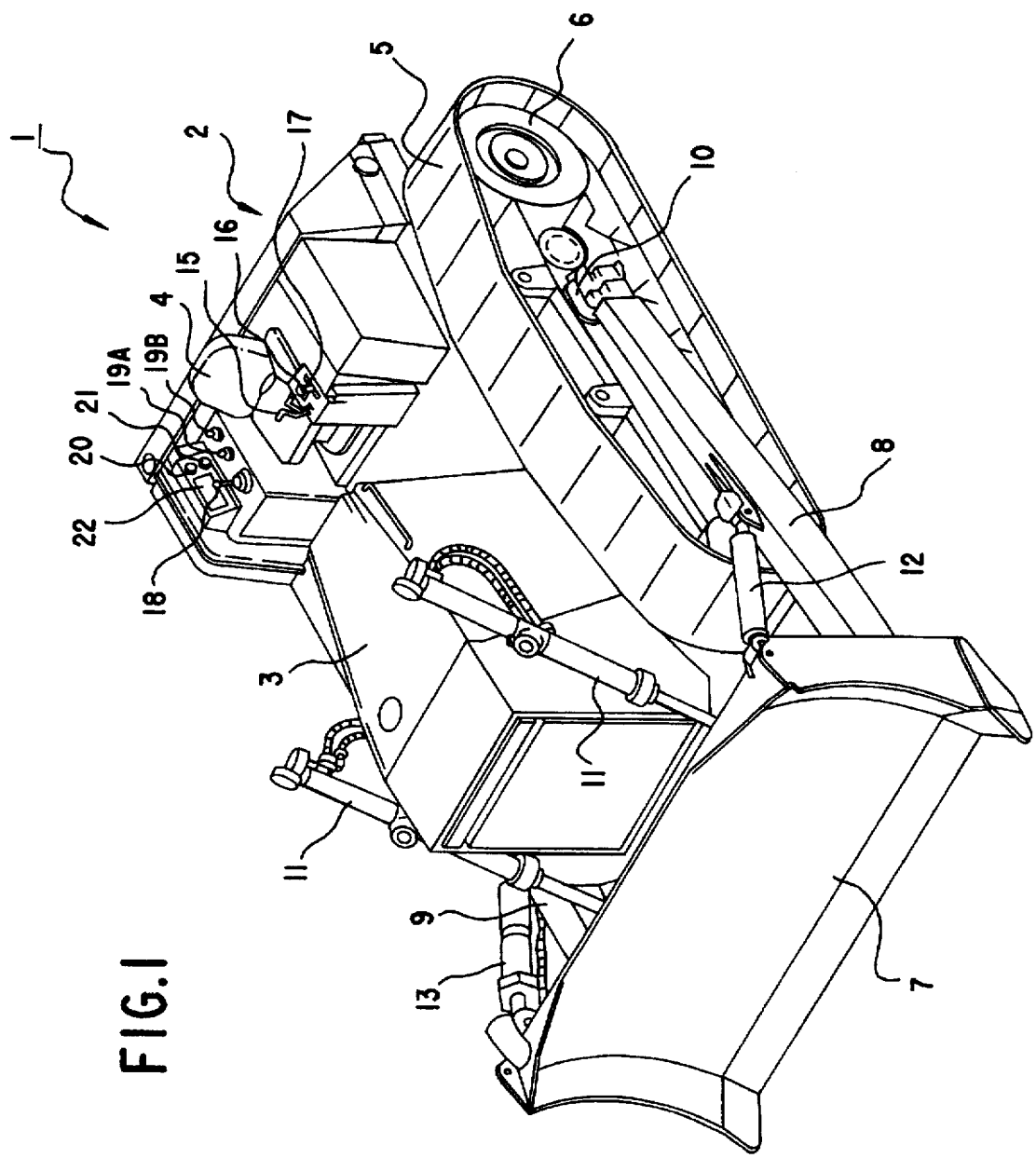

Referring to FIG. 1, there is shown an external appearance of a bulldozer 1 which is provided with, on a vehicle body 2 thereof, a bonnet 3 for housing an engine (not shown) and an operator seat 4 for the operator who drives the bulldozer 1. Both sides (i.e., the right and left sides when the vehicle body 2 is viewed in its moving direction) of the vehicle body 2 are provided with crawler belts 5 (the crawler belt on the right side is not shown) for running the vehicle body 2 so as to turn or move back and forth. These crawler belts 5 are independently driven by their respective corresponding sprockets 6 actuated by driving force transmitted from the engine.

There are provided straight frames 8, 9 for supporting a blade 7 at the forward ends thereof. The base ends of these right and left straight frames 8, 9 are pivotally supported at the right and left sides of the vehicle body 2 by trunnions 10 (the trunnion at the right side is not shown) in such a manner that the blade 7 can be lifted or lowered. Disposed between the blade 7 and the vehicle body 2 are right and left blade lift cylinders 11 forming a pair for lifting or lowering the blade 7. A brace 12 is disposed between the blade 7 and the left straight frame 8 and a blade tilt cylinder 13 is disposed between the blade 7 and the right straight frame 9. The brace 12 and the blade tilt cylinder 13 function to incline the blade 7 to the right and left.

There are provided a steering lever 15, a transmission shift lever 16 and a fuel control lever 17 on the left of the operator seat 4 when the vehicle body 2 is viewed in its moving direction. On the right of the operator seat 4, there are provided a blade control lever 18 for lifting, lowering the blade 7 and inclining it to the right and left; a first dial switch 19A for setting the magnitude of loads applied to the blade 7 by digging and carrying and a second dial switch 19B for compensating for the set magnitude of loads by addition or subtraction of a correction value; an automatic driving mode pressing selector switch 20 for switching ON/OFF of the automatic driving mode for dozing operation; a lock-up selector switch 21 for switching ON/OFF of the lock-up of a torque convertor; and a display unit 22. Although it is not shown in the drawing, there is provided a decelerator pedal in front of the operator seat 4.

Figure 2:
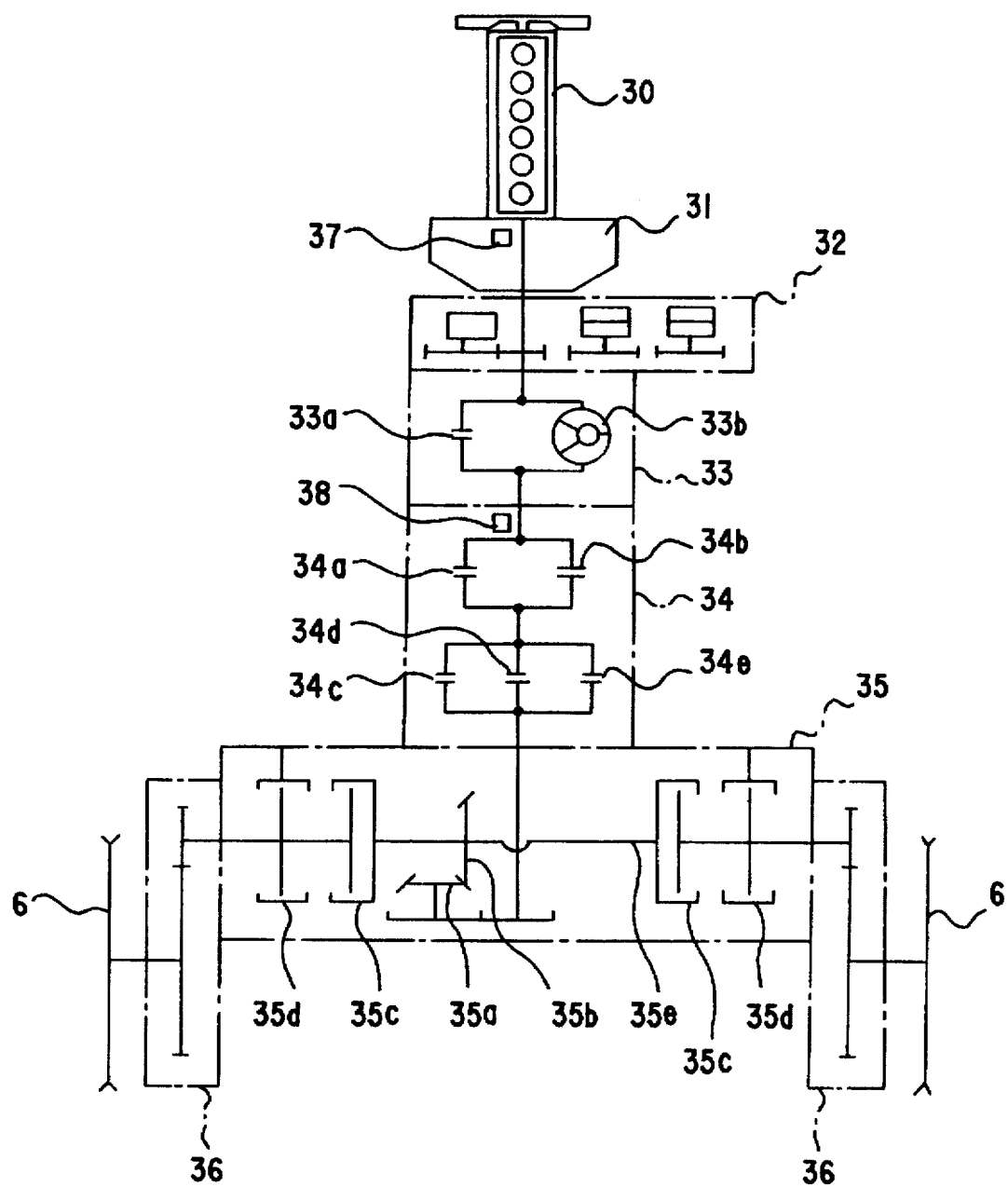

Referring to FIG. 2 which shows a power transmission system, a rotary driving force from an engine 30 is transmitted to a torque convertor with a lock-up mechanism 33 through a damper 31 and a PTO 32. The torque convertor with a lock-up mechanism 33 includes a lock-up mechanism 33a and a pump 33b, and the PTO 32 functions to drive various hydraulic pumps including hydraulic pumps for operational machines. The rotary driving force is then transmitted from an output shaft of the torque convertor with a lock-up mechanism 33 to a transmission 34 such as e.g., a planetary gear lubricated multiple-disc clutch transmission, an input shaft of which is connected to the above output shaft. The transmission 34 includes forward and reverse clutches 34a, 34b and first to third clutches 34c to 34e so that the revolution of the output shaft of the transmission 34 can be shifted in three stages in both forward and backward directions. The rotary driving force from the output shaft of the transmission 34 is transmitted to a steering mechanism 35 that includes a transverse shaft 35e on which disposed are a pinion 35a, bevel gear 35b, right and left steering clutches 35c forming a pair, and right and left steering brakes 35d forming a pair. Thereafter, the rotary driving force is transmitted to a pair of final reduction mechanisms 36 disposed on the right and left hands so that each of the sprockets 6 for running the crawler belts 5 is driven. Note that Reference numeral 37 denotes an engine revolution sensor for detecting the revolution speed of the engine 30 and Reference numeral 38 denotes a torque convertor output shaft revolution sensor for detecting the revolution speed of the output shaft of the torque convertor with a lock-up mechanism 33.

Figure 3:
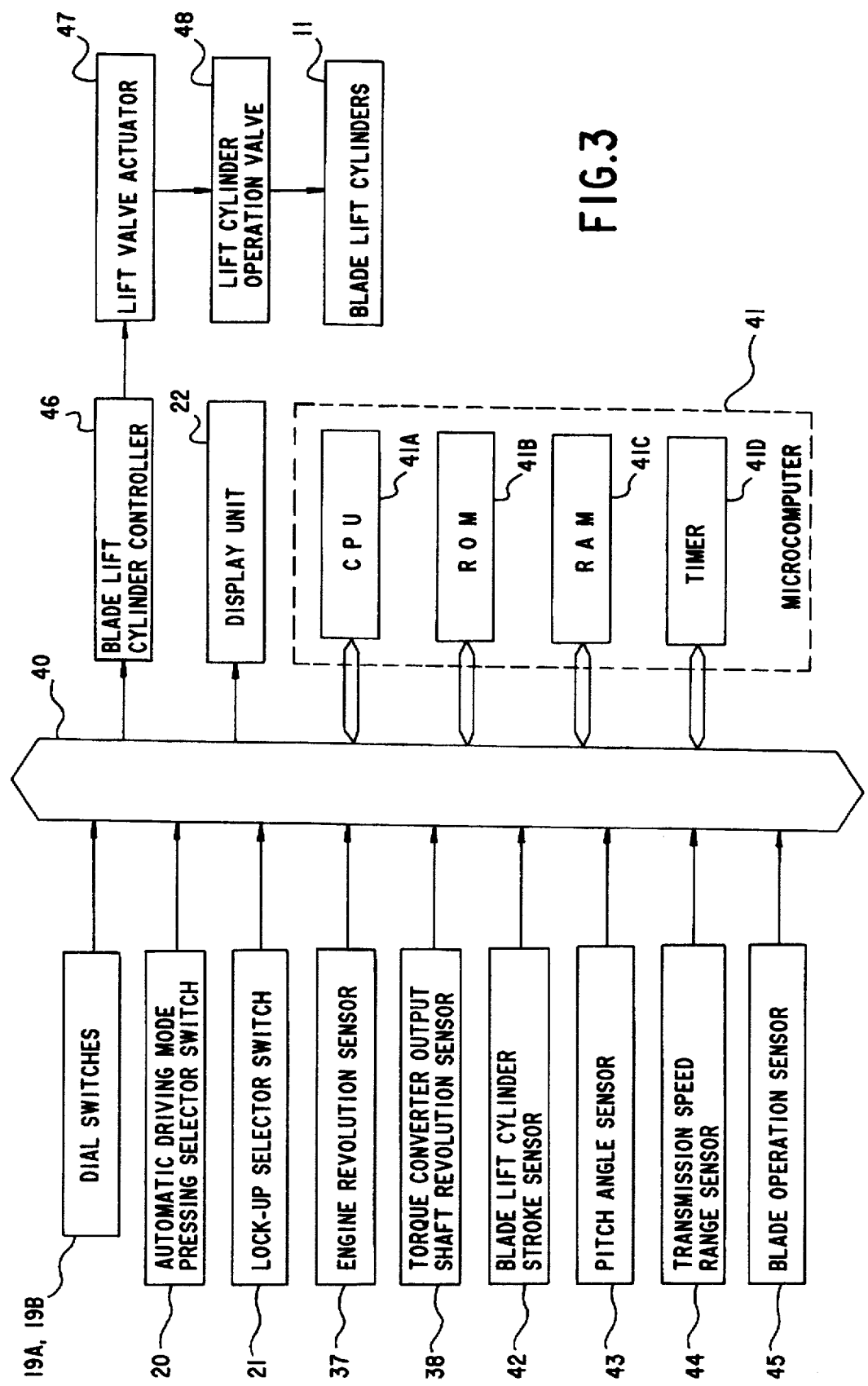

Referring to FIG. 3 which schematically shows the overall construction of the running slip control system for a bulldozer of the invention, the following data items are supplied to a microcomputer 41 through a bus 40: (i) dial value data sent from the first dial switch 19A, for informing the magnitude of loads applied to the blade 7 by digging and carrying, the magnitude being set by the first dial switch 19A; (ii) dial value data sent from the second dial switch 19B, for informing a correction value to be added to or subtracted from the set value of the magnitude of loads; (iii)

an automatic/manual driving mode instruction sent from the automatic driving mode pressing selector switch 20, for informing whether the automatic driving mode for dozing operation has been selected; (iv) a lock-up (L/U)/torque converting (T/C) instruction sent from the lock-up selector switch 21, for informing whether the lock-up of the torque convertor with a lock-up mechanism 33 has been selected; (v) revolution speed data sent from the engine revolution sensor 37, for informing the revolution speed of the engine 30; and (vi) revolution speed data sent from the torque convertor output shaft revolution sensor 38, for informing the revolution speed of the output shaft of the torque convertor with a lock-up mechanism 33. The following data are also supplied to the microcomputer 41 through the bus 40: (i) stroke positional data sent from a blade lift cylinder stroke sensor 42 that detects the respective stroke positions of the right and left blade lift cylinders 11 for lifting and lowering the blade 7; (ii) tilt angle data sent from a tilt angle sensor 43 that detects the varying tilt angle of the vehicle body 2 inclining back and forth in every movement; (iii) speed range data sent from a transmission speed range sensor 44 that detects a speed range condition of the transmission 34, more specifically, which of three speed ranges in forward and reverse has been selected by changing the gears through the operation of the transmission shift lever 16; and (iv) manual driving operation data from a blade operation sensor 45 that detects whether the blade 7 is set in manual driving operation carried out by the blade control lever 18.

The microcomputer 41 is composed of a central processing unit (CPU) 41A for executing a specified program; a read only memory (ROM) 41B for storing the above program and various maps such as a curved engine characteristic map and curved torque convertor characteristic map; a random access memory (RAM) 41C serving as a working memory necessary for executing the program and as registers for various data; and a timer 41D for measuring elapsed time for an event in the program. The program is executed in accordance with (i) the dial value data on the magnitude of loads applied to the blade 7 by digging and carrying; (ii) the dial value data on a correction value to be added to or subtracted from the value of the magnitude of loads; (iii) the automatic/manual driving mode instruction for dozing operation; (iv) the (L/U)/(T/C) instruction for the torque convertor with a lock-up mechanism 33; (v) the revolution speed data on the engine 30; and (vi) the revolution speed data on the output shaft of the torque convertor with a lock-up mechanism 33; (vii) the respective stroke positional data on the right and left blade lift cylinders 11; (viii) the pitch angle data on the vehicle body 2 inclining back and forth; (ix) the speed range data on the gear condition of the transmission 34; and (x) the manual driving operation data on the blade 7. Then, the amount of lift operation for lifting or lowering the blade 7 is supplied to a blade lift cylinder controller 46, and the right and left blade lift cylinders 11 are driven based on the lift operation amount by means of the controller 46 with the help of a lift valve actuator 47 and a lift cylinder operation valve 48, whereby the blade 7 is lifted or lowered. The display unit 22 displays such information as whether dozing operation by the bulldozer 1 is presently in the automatic driving mode or manual driving mode.

Figure 4A:
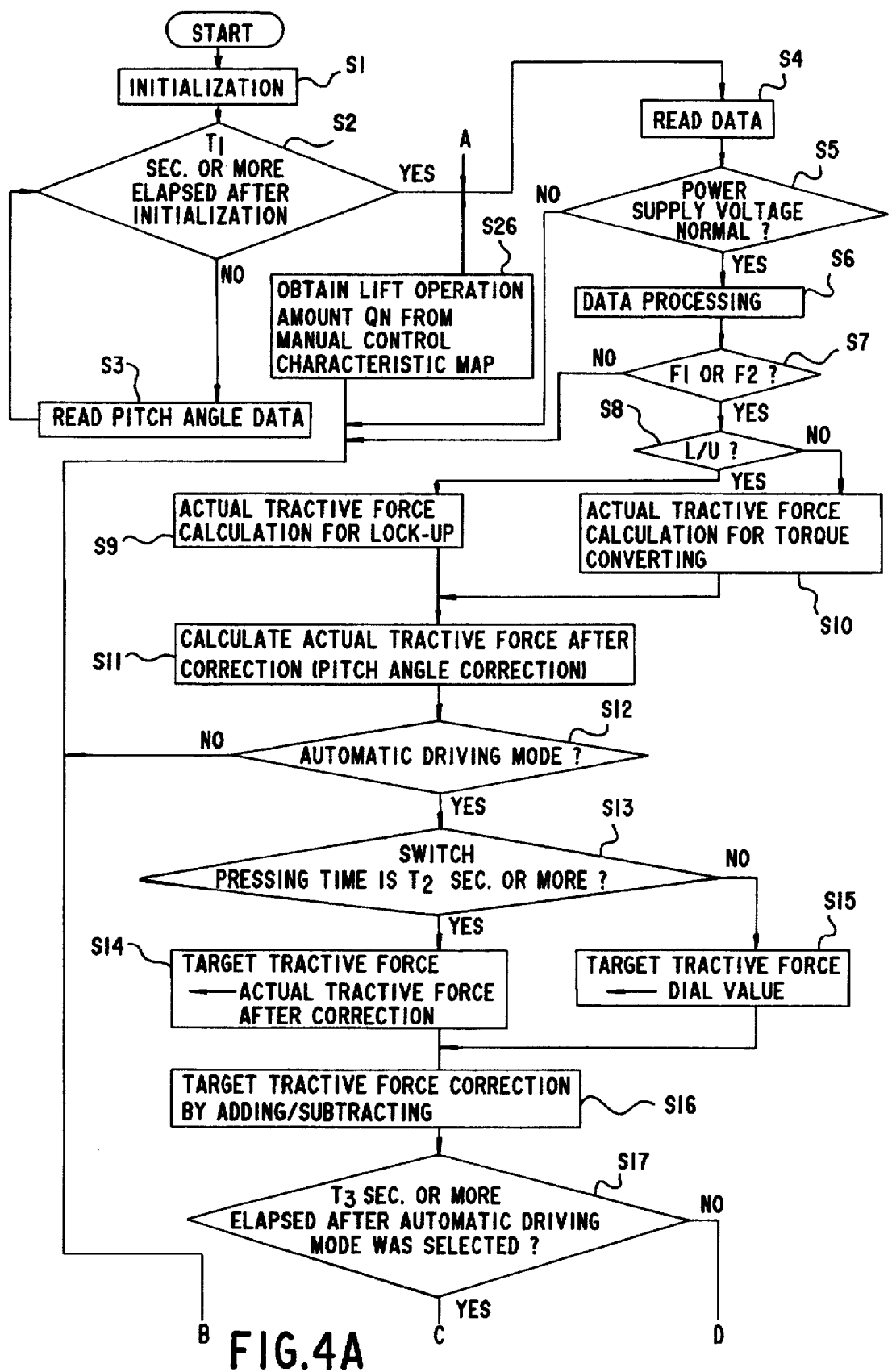
FIGS. 4A and 4B are flowcharts of a dozing program.
Figure 4B:
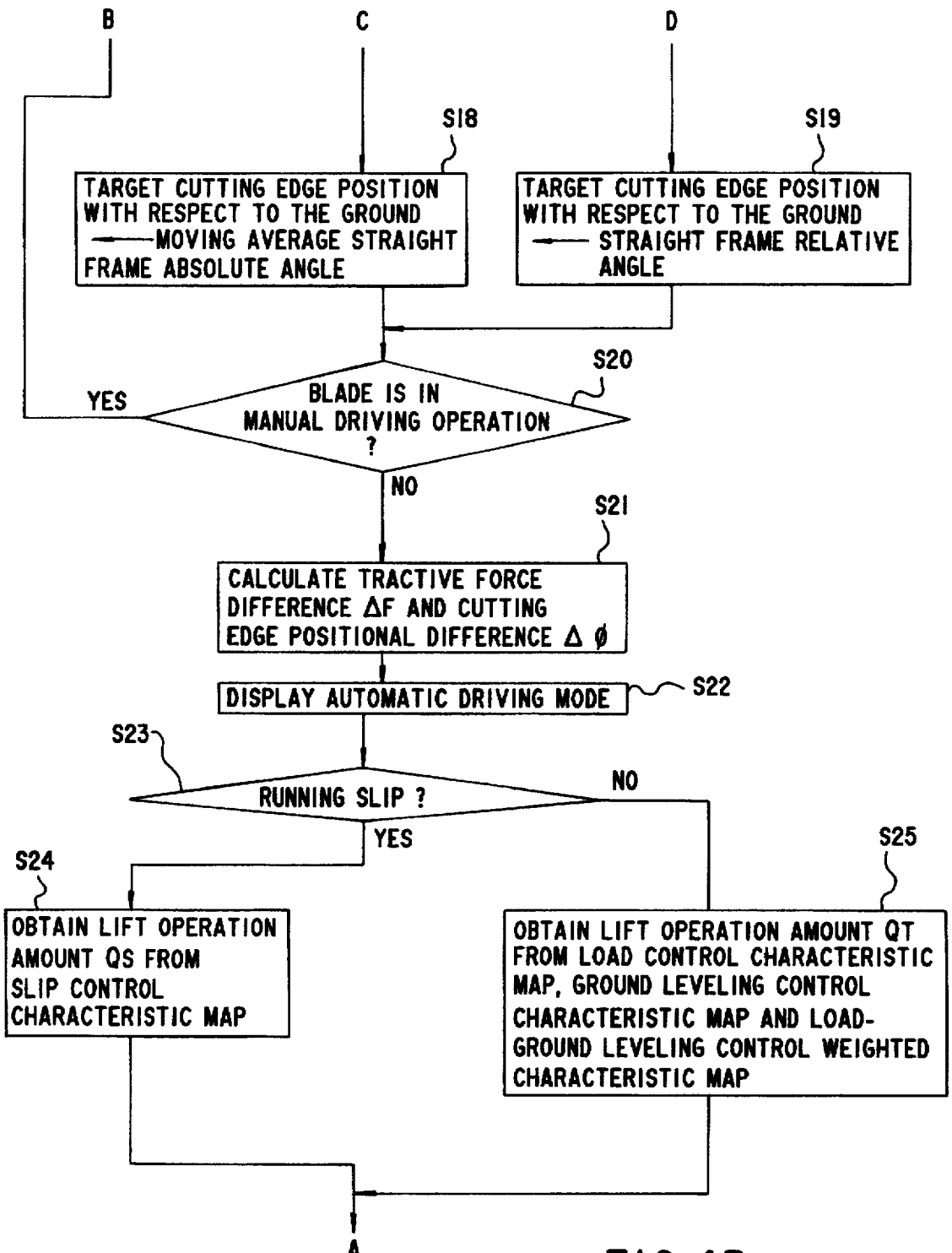

Now reference is made to the flowchart of FIG. 4 for explaining, in detail, the performance of the running slip control system for a bulldozer having the above-described arrangement.

Step 1 to Step 3: Power is loaded to start the execution of the specified program and initialization such as clearing all the data of the registers in the RAM 41C is executed. For $t_1$ seconds after the initialization, pitch angle data are sequentially read from the pitch angle sensor 43 as initial values. The reason why pitch angle data are sequentially read as initial values is that the pitch angle of the vehicle body 2 is obtained by frequency separation using the moving averages of the pitch angle data.

Step 4 to Step 6: The following data are firstly read. (i) the dial value data from the first dial switch 19A, for informing the magnitude of loads applied to the blade 7 by digging and carrying, the value of the magnitude being set by the first dial switch 19A; (ii) the dial value data from the second dial switch 19B, for informing a correction value to be added to or subtracted from the set value of the magnitude of loads; (iii) the automatic/manual driving mode instruction for dozing operation from the automatic driving mode pressing selector switch 20; (iv) the (L/U)/(T/C) instruction for the torque convertor with a lock-up mechanism 33 from the lock-up selector switch 21; (v) the revolution speed data from the engine revolution sensor 37, informing the revolution speed of the engine 30; and (vi) the revolution speed data from the torque convertor output shaft revolution sensor 38, informing the revolution speed of the output shaft of the torque convertor with a lock-up mechanism 33; (vii) the stroke positional data from the blade lift cylinder stroke sensor 42 for informing the respective stroke positions of the right and left blade lift cylinders 11; (viii) the pitch angle data from the pitch angle sensor 43 for informing the pitch angle of the vehicle body 2 inclining back and forth; (ix) the speed range data from the transmission speed range sensor 44, for informing the gear condition of the transmission 34; and (x) the manual driving operation data from the blade operation sensor 45, for informing whether the blade 7 is set in manual driving operation. Then, if the voltage of the power source is normal, i.e., more than a specified value and the electronic circuit is in a normal condition, the following data processing is executed.

1. Low frequency elements are derived from the sequentially read pitch angle data by frequency separation, utilizing the method of moving averages, whereby the pitch angle of the vehicle body 2 is obtained.

2. Then, acceleration elements are derived by frequency separation, specifically, by subtracting the above low frequency elements from the pitch angle data sequentially read, whereby the acceleration of the vehicle body 2 is obtained.

3. Based on data obtained by averaging the data on the respective stroke positions of the right and left blade lift cylinders 11, a straight frame relative angle $\psi_1$, which is the average of the angles of the right and left straight frames 8, 9 to the vehicle body 2, is obtained.

4. From the straight frame relative angle $\psi_1$ and the pitch angle of the vehicle body 2 thus obtained, a straight frame absolute angle, which is the average of the angles of the right and left straight frames 8, 9 to the ground, is obtained. Then, a moving average straight frame absolute angle $\psi_2$ is obtained by the method of moving averages in which the straight frame absolute angle which varies every moment is observed for 5 seconds.

Step 7 to Step 11: When the speed range condition (gear condition) of the transmission 34 is the first forward speed F1 or the second forward speed F2, an actual tractive force $F_R$ is calculated in either of the following methods selected depending on whether the (L/U)/(T/C) instruction for the torque converter with a lock-up mechanism 33 is "lock-up" or "torque converting".

1. "Lock-up"

Figure 5:
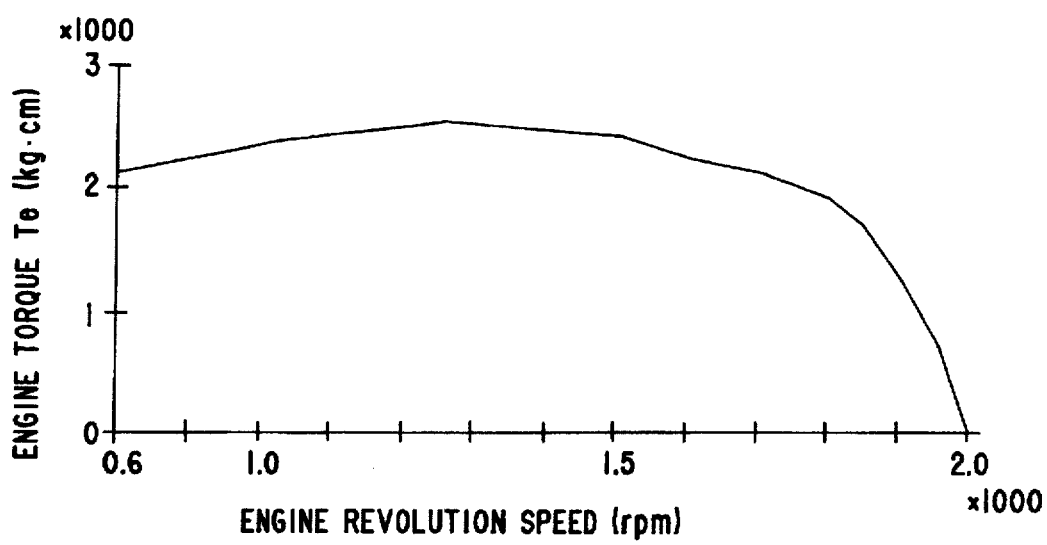
Figure 6:
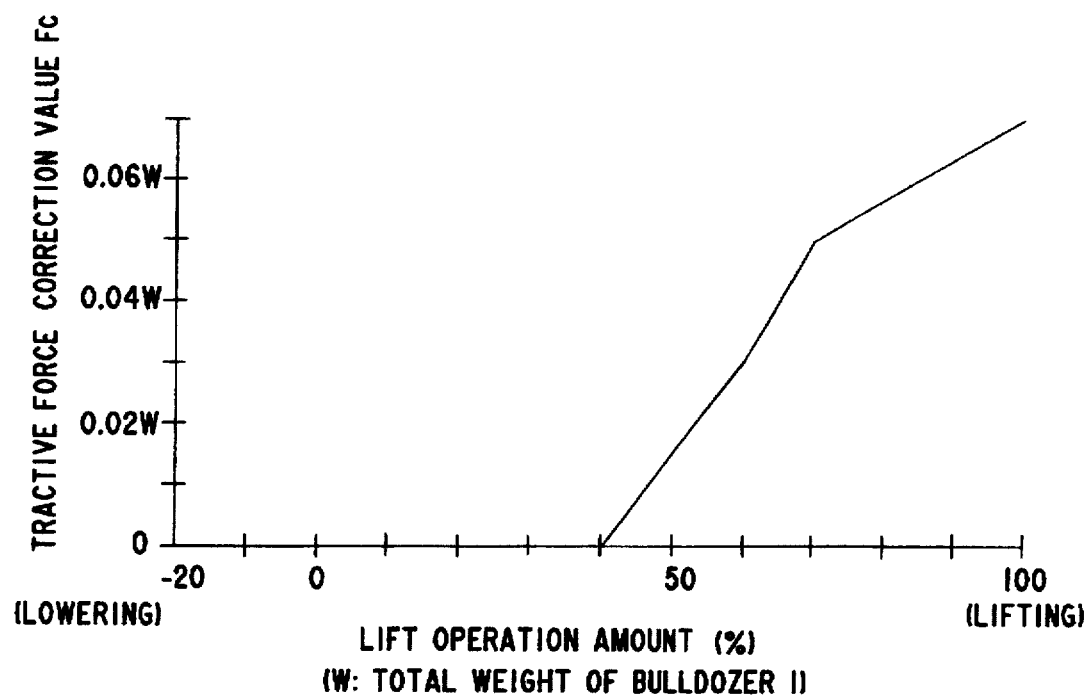

An engine torque Te is obtained from the curved engine characteristic map shown in FIG. 5, using the revolution speed Ne of the engine 30. Then, the engine torque Te is multiplied by a reduction ratio $k_{se}$ provided over the range of the transmission 34, the steering mechanism 35 and the final reduction mechanisms 36 (in other words, the reduction ratio $k_{se}$ between the output shaft of the torque convertor with a lock-up mechanism 33 and the sprockets 6) and further multiplied by the diameter r of the sprockets 6, to thereby obtain a tractive force Fe (=Te×$k_{se}$×r). A tractive force correction value Fc is subtracted from the tractive force Fe, thereby obtaining the actual tractive force $F_R$ (=Fe−Fc). The tractive force correction value Fc corresponds to the use of the hydraulic pumps for operational machines including the hydraulic pump working on the blade lift cylinders 11 in the PTO 32 and can be obtained from the pump correction characteristic map shown in FIG. 6, using the lift operation amount of the blade 7.

2. "Torque converting"

Figure 7:
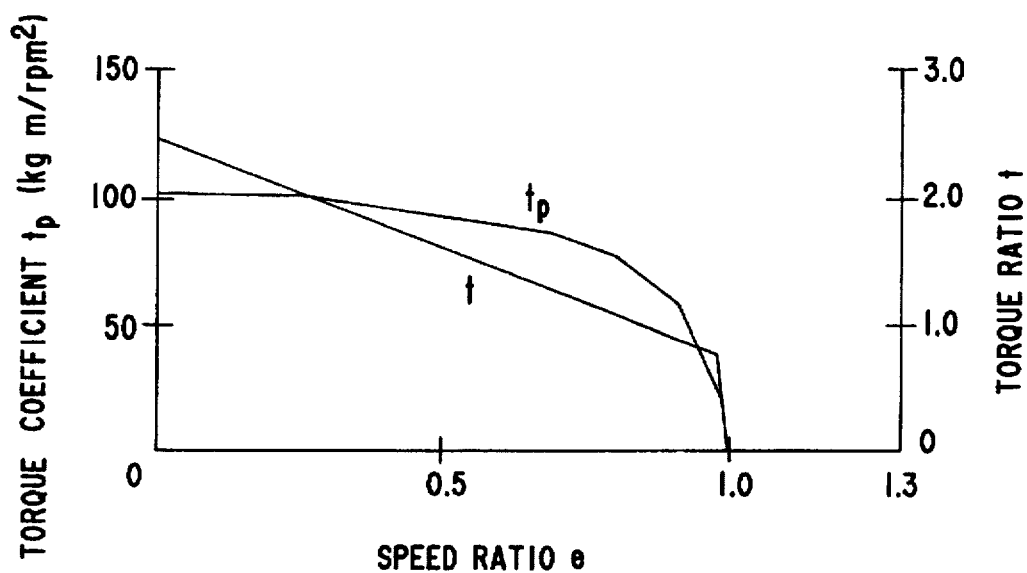

A torque coefficient $t_p$ and torque ratio t are obtained from the curved torque convertor characteristic map shown in FIG. 7, using the speed ratio e (=Nt/Ne) that is the ratio of the revolution speed Ne of the engine 30 to the revolution speed Nt of the output shaft of the torque convertor with a lock-up mechanism 33, and then a torque convertor output torque Tc (=$t_p$×(Ne/1000)$^2$×t) is obtained. Similarly to the case 1, the torque convertor output torque Tc is multiplied by the reduction ratio $k_{se}$ between the output shaft of the torque convertor with a lock-up mechanism 33 and the sprockets 6 and further multiplied by the diameter r of the sprockets 6, to thereby obtain the actual tractive force $F_R$ (=Tc×$k_{se}$×r).

Figure 8:
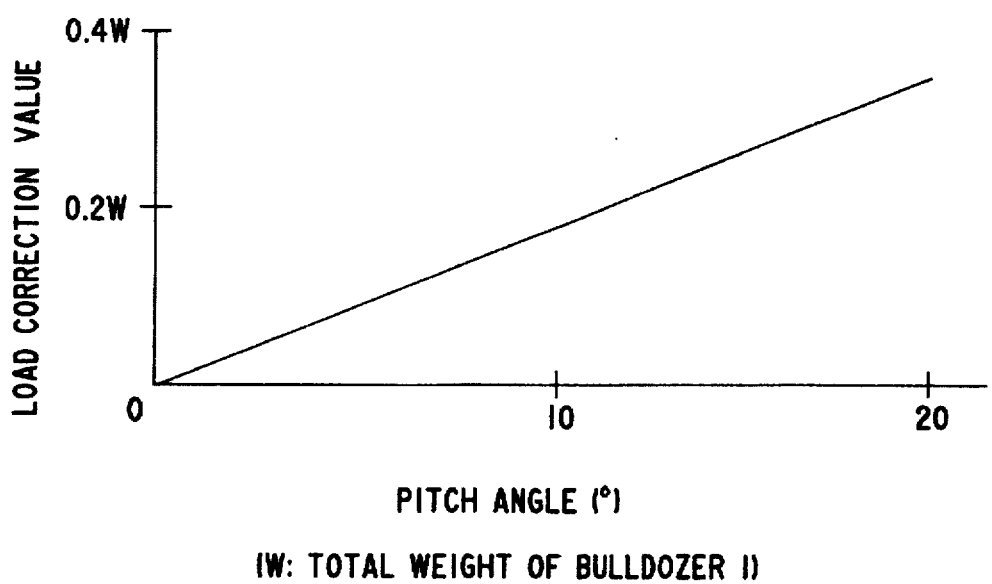

A load correction value which corresponds to the pitch angle of the vehicle body 2 and can be obtained from the pitch angle-load correction value characteristic map shown in FIG. 8, is subtracted from the actual tractive force $F_R$ thus obtained, thereby obtaining an actual tractive force after correction F.

Step 12 to Step 16: If the automatic/manual driving mode instruction for the automatic driving mode pressing selector switch 20 indicates the automatic driving mode of dozing operation, the following steps will be taken.

1. If a pressing time for operating the automatic driving mode pressing selector switch 20 is $t_2$ seconds or more, the actual tractive force after correction F is set as a target tractive force Fo.

2. If the pressing time for operating the automatic driving mode pressing selector switch 20 is less than $t_2$ seconds, a dial value set by the first dial switch 19A, corresponding to the magnitude of loads applied to the blade 7 by digging and carrying is set as the target tractive force Fo.

Then, the target tractive force Fo which has been set is corrected by adding or subtracting a dial value of the second dial switch 19B and is renewed, the dial value being a correction value for the magnitude of loads set by the first dial switch 19A.

Step 17 to Step 19: If the automatic/manual driving mode instruction for the automatic driving mode pressing selector switch 20 indicates the automatic driving mode of dozing operation and $t_3$ seconds or more have elapsed after the automatic driving mode was selected by the above instruction, the moving average straight frame absolute angle $\psi_2$ is set as a target cutting edge position $\psi_0$ with respect to the ground for the cutting edge of the blade 7. On the other hand, when less than $t_3$ seconds have elapsed, the straight frame relative angle $\psi_1$ is set as the target cutting edge position $\psi_0$ with respect to the ground for the cutting edge of the blade 7.

Step 20 to Step 22: When the dozing operation is not in the manual driving operation, that is, the blade 7 is not manually operated by the blade control lever 18, the tractive force difference ΔF between the target tractive force Fo and the actual tractive force after correction F as well as the positional difference Δψ between the target cutting edge position $\psi_0$ with respect to the ground and the moving average straight frame absolute angle $\psi_2$ are obtained. In the meantime, the display unit 22 indicates that the dozing operation is in the automatic driving mode.

Step 23 to Step 25: From moving average acceleration obtained by applying the method of moving averages to the acceleration of the vehicle body 2 which has been obtained from the acceleration elements derived from the pitch angle data by frequency separation and the actual tractive force after correction F, shoe slip (i.e., the running slip of the vehicle body 2) is detected as running slip. The detection is judged based on the following conditions.

1. If either of the following conditions is satisfied, the occurrence of running slip is admitted.

(1°≈0.0174G, W: the total weight of the bulldozer 1)

(1) the moving average acceleration α<−4° or (2) the moving average acceleration α<−2° and the actual tractive force after correction F>0.6W 2. If either of the following conditions is satisfied, it is admitted that after occurring, running slip has stopped.

(1) the moving average acceleration α>0.1° or (2) the actual tractive force after correction F>the actual tractive force after correction at the time of the start of running slip F−0.1W After judging whether or not running slip has occurred based on the foregoing conditions, either of the following steps will be taken in accordance with the judgment.

1. If it is judged that running slip has occurred, a lift operation amount $Q_S$ for lifting the blade 7 is obtained from a slip control characteristic map (not shown) in order to eliminate the running slip by reducing loads applied to the blade 7 by digging and carrying.

2. If it is judged that no running slip has been detected, lift operation amounts $Q_1$ and $Q_2$ are obtained in the following ways.

Figure 9:
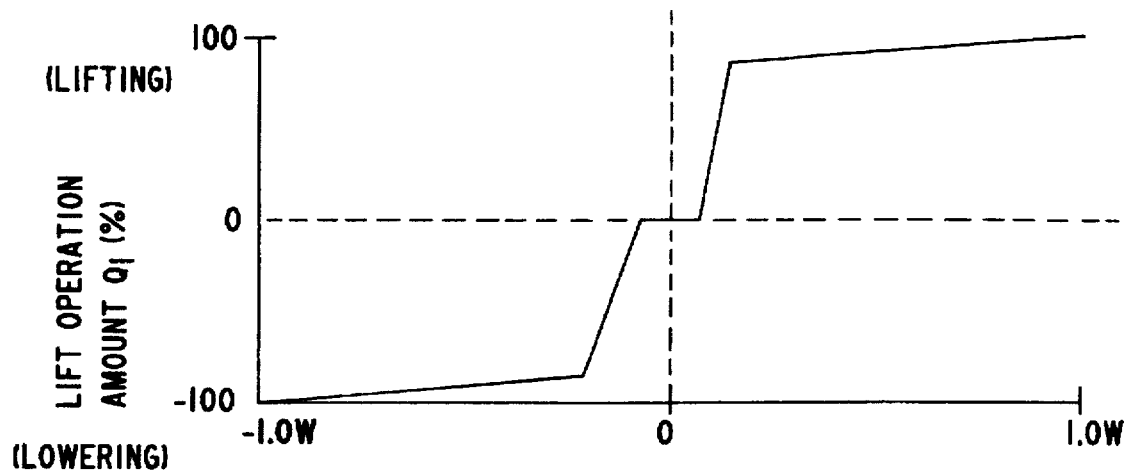

(1) Using the tractive force difference ΔF between the target tractive force Fo and the actual tractive force after correction F, the lifting amount $Q_1$ for lifting or lowering the blade 7 such that the actual tractive force after correction F becomes coincident with the target tractive force Fo is obtained from a load control characteristic map shown in FIG. 9.

Figure 10:
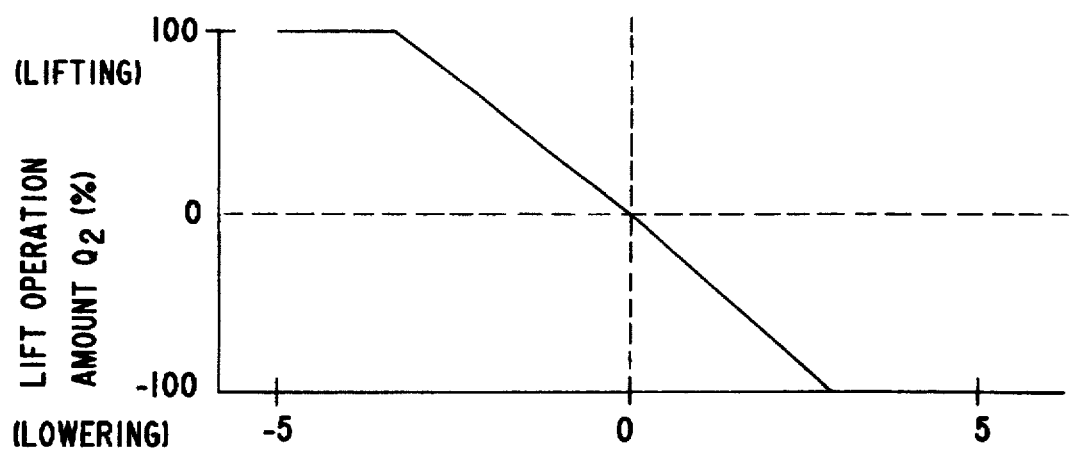

(2) Using the positional difference Δψ between the target cutting edge position with respect to the ground $\psi_0$ and the moving average straight frame absolute angle $\psi_2$, the lift operation amount $Q_2$ for lifting or lowering the blade 7 such that the moving average straight frame absolute angle $\psi_2$ becomes coincident with the target cutting edge position with respect to the ground $\psi_0$ from a ground leveling control characteristic map shown in FIG. 10.

Figure 11:
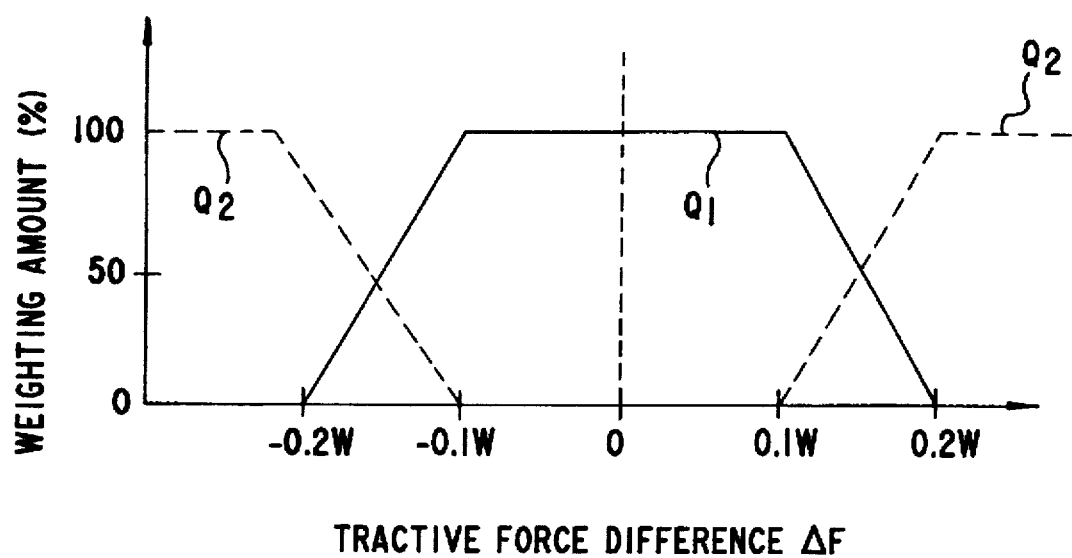

(3) Then, the lift operation amounts $Q_1$, $Q_2$ are weighted in accordance with a load-ground leveling control weighted characteristic map shown in FIG. 11, using the tractive force difference ΔF , whereby a lift operation amount $Q_T$ is obtained. According to the weighted map, when the tractive force difference ΔF is within the range of ±0.1 W, the load control is performed in preference to the ground leveling control.

When the voltage of the power source is not normal, being less than the specified value and the electronic circuit functions abnormally; when the transmission 34 is in other speed range conditions (gear conditions) than the first forward speed F1 or the second forward speed F2; when the automatic/manual driving mode instruction for the automatic driving mode pressing selector switch 20 indicates the manual driving mode of dozing operation; or when the operation is the manual driving operation that the blade 7 is manually controlled with the blade control lever 18, a lift operation amount $Q_N$ for lifting or lowering the blade 7 is obtained from a manual control characteristic map (not shown), according to the operation amount of the blade control lever 18 in Step 26.

The above-mentioned lift operation amounts $Q_S$, $Q_T$ and $Q_N$ are supplied to the blade lift cylinder controller 46 which actuates the blade lift cylinders 11 through the lift valve actuator 47 and the lift cylinder operation valve 48 in accordance with the lift operation amounts $Q_S$, $Q_T$ and $Q_N$, thereby performing a desired control in lifting or lowering of the blade 7.

Although the actual tractive force is obtained by calculation in the foregoing embodiment, it could be obtained in other ways: for example, a driving torque sensor for detecting the driving torque of the sprockets 6 is employed and the actual tractive force is obtained based on the amount of driving torque detected by the driving torque sensor. Another alternative is that a bending stress sensor for detecting the amount of bending stress generated at the trunnions 10 by the straight frames 8, 9 for supporting the blade 7 is employed and the actual tractive force is obtained based on the amount of bending stress detected by the bending stress sensor.

In the foregoing embodiment, the invention has been particularly described with the power transmission system equipped with the torque convertor having a lock-up mechanism, but the invention is not necessarily limited to this as it may be applied to cases where a torque convertor having no lock-up mechanism or a direct transmission having no torque convertor is employed. When such a direct transmission is employed, the actual tractive force is calculated in the same way as described in the case of "lock-up" in the foregoing embodiment.

Further, in the embodiment, the running slip of the vehicle body 2 is detected by deriving acceleration elements from the pitch angle data output from the pitch angle sensor 43 by frequency separation, it may be detected from the output of an independent acceleration sensor, the output indicating the accelerated condition of the vehicle body 2. Alter-natively, a Doppler speed meter is employed and the running slip is detected by comparing the actual speed of the vehicle body 2 measured by the Doppler speed meter with the traveling speed of the crawler belts 5 for running the vehicle body 2.

Although the target cutting edge position with respect to the ground is set by calculation in the foregoing embodiment, it may be set by a dial switch similarly to the case of the target tractive force.

What is claimed is:

1. A running slip control system for a bulldozer, comprising:
   (a) a running slip detecting means for detecting running slip of a vehicle body, wherein the vehicle running slip is detected based on a set of acceleration values of the vehicle body attained from acceleration components of the vehicle body; and
   (b) a blade controlling means for lifting a blade to eliminate the running slip when the running slip detecting means detects the occurrence of running slip, wherein the blade lifting control performed by the bald controlling means to eliminate the running slip is performed in the automatic driving mode on condition that transmission is placed in first forward speed or intermediate forward speed and the blade is not in manual operation.

2. The running slip control system for a bulldozer as claimed in claim 1, wherein the running slip detecting means comprises a pitch angle sensor for detecting a pitch angle of the vehicle body when the vehicle body inclines back and forth, and the running slip detecting means detects the running slip of the vehicle body by extracting acceleration components by frequency separation from an output of the pitch angle sensor which indicates the varying back-and-forth inclining condition of the vehicle body.

3. The running slip control system for a bulldozer as claimed in claim 1, wherein the running slip detecting means comprises an acceleration sensor and detects the running slip of the vehicle body from an output of the acceleration sensor which indicates the accelerating condition of the vehicle body.

4. The running slip control system for a bulldozer as claimed in claim 1, wherein the running slip detecting means includes a Doppler speed meter and detects the running slip of the vehicle body by comparing the actual speed of the vehicle body measured by the Doppler speed meter with a running speed of crawler belts for running the vehicle body.

5. The running slip control system for a bulldozer as claimed in claim 1, wherein the running slip detecting means comprises:
   (a) a moving average acceleration detecting means for detecting moving average acceleration from a set of acceleration values of the vehicle body, using moving average;
   (b) a pitch angle detecting means for detecting a pitch angle of the vehicle body when the vehicle body inclines back and forth; and
   (c) an actual tractive force detecting means for detecting an actual tractive force of the vehicle body and for correcting the detected actual tractive force according to the pitch angle detected by the pitch angle detecting means,
   wherein the running slip detecting means detects the running slip of the vehicle body when the moving average acceleration detected by the moving average acceleration detecting means is less than a negative value of a first predetermined angle (x°) obtained from the set of acceleration values of the vehicle body which are attained from acceleration components extracted from the pitch angle detected from the pitch angle detecting means where x=1° is approximately 0.0174G, or when the moving average acceleration is not less than the negative value of the first predetermined angle and less than a negative value of a second predetermined angle (y°) obtained from the set of acceleration values of the vehicle body which are attained from acceleration components extracted from the pitch angle detected from the pitch angle detecting means and the actual tractive force detected and corrected by the actual tractive force detecting means is not less than zW where z is a constant and where W represents the total weight of the bulldozer.

6. The running slip control system for a bulldozer as claimed in claim 5, wherein the moving average acceleration detecting means includes the pitch angle sensor for detecting the pitch angle of the vehicle body when the vehicle body inclines back and forth and detects the moving average acceleration from the acceleration values of the vehicle body which are obtained from acceleration components extracted by frequency separation from the output of the pitch angle sensor, the output indicating the varying back-and-forth inclining condition of the vehicle body.

7. The running slip control system for a bulldozer as claimed in claim 5, wherein the actual tractive force detecting means comprises an engine revolution sensor for detecting a revolution speed Ne of an engine and a torque convertor output shaft revolution sensor for detecting a revolution speed Nt of an output shaft of a torque convertor, and wherein the actual tractive force detecting means detects the actual tractive force of the vehicle body in such a way that speed ratio e (=Nt/Ne) which is a ratio of the engine revolution speed Ne detected by the engine revolution sensor to the torque convertor output shaft revolution speed Nt detected by the torque convertor output shaft revolution sensor, is obtained; a torque convertor output torque is obtained from a torque convertor characteristic of the torque convertor, using the speed ratio e; and the torque convertor output torque is multiplied basically by a reduction ratio between the output shaft of the torque convertor and sprockets for driving crawler belts used for running the vehicle body.

8. The running slip control system for a bulldozer as claimed in claim 5, wherein the actual tractive force detecting means comprises an engine revolution sensor which detects a revolution speed of an engine when a lock-up mode is selected in a torque convertor equipped with a lock-up mechanism or when a direct transmission is employed, and wherein the actual tractive force detecting means detects the actual tractive force of the vehicle body in such a way that engine torque is obtained from an engine torque characteristic of the engine, using the revolution speed of the engine detected by the engine revolution sensor; and then, the engine torque is multiplied basically by a reduction ratio between the engine and sprockets for driving crawler belts used for running the vehicle body.

9. The running slip control system for a bulldozer as claimed in claim 5, wherein the actual tractive force detecting means comprises a driving torque sensor which detects an amount of driving torque of sprockets for driving crawler belts used for running the vehicle body, and wherein the actual tractive force detecting means detects the actual tractive force of the vehicle body based on the amount of driving torque detected by the driving torque sensor.

10. The running slip control system for a bulldozer as claimed in claim 5, wherein the actual tractive force detecting means comprises a bending stress sensor which detects an amount of bending stress generated at trunnions that are joints between the vehicle body and straight frames for supporting the blade, and wherein the actual tractive force detecting means detects the actual tractive force of the vehicle body based on the amount of bending stress detected by the bending stress sensor.

11. A running slip control system for a bulldozer, comprising:

(a) a running slip detecting means for detecting running slip of a vehicle body; and (b) a blade controlling means for lifting a blade to eliminate the running slip when the running slip detecting means detects the occurrence of running slip, wherein the running slip detecting means includes a Doppler speed meter and detects the running slip of the vehicle body by comparing the actual speed of the vehicle body measured by the Doppler speed meter with a running speed of crawler belts for running the vehicle body, and wherein the blade lifting control performed by the bald controlling means to eliminate the running slip is performed in the automatic driving mode on condition that transmission is placed in first forward speed or intermediate forward speed and the blade is not in manual operation.

* * * * *